(12) United States Patent
Chang (10) Patent No.: US 9,979,276 B2
(45) Date of Patent: May 22, 2018

(54) CONTROL CIRCUIT FOR STOPPING VOLTAGE BOOSTER AND ELECTRONIC DEVICE USING THE SAME

(71) Applicant: NUVOTON TECHNOLOGY CORPORATION, Hsinchu (TW)

(72) Inventor: Pao-Shu Chang, Hsinchu Science Park (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days. days.

(21) Appl. No.: 15/438,181

(22) Filed: Feb. 21, 2017

(65) Prior Publication Data

US 2018/0069470 A1 Mar. 8, 2018

(30) Foreign Application Priority Data

Sep. 8, 2016 (TW) .............................. 105129093 A (51) Int. Cl.
*H02M 1/36* (2007.01)
*H02J 7/00* (2006.01)
*H02M 3/04* (2006.01)

(52) U.S. Cl.
CPC .............. *H02M 1/36* (2013.01); *H02M 3/04* (2013.01); *H02J 7/007* (2013.01); *H02J 7/0052* (2013.01)

(58) Field of Classification Search
CPC .. H02M 1/36; H02M 3/04; H02J 7/007; H02J 7/0052
See application file for complete search history.

(56) References Cited

U.S. PATENT DOCUMENTS 6,429,623 B2 * 8/2002 Hanada .................. H02J 7/345
320/116
9,385,556 B2 * 7/2016 Groat ...................... H02J 7/045

* cited by examiner

*Primary Examiner* — Emily P Pham
(74) *Attorney, Agent, or Firm* — Muncy, Geissler, Olds & Lowe, P.C.

(57) ABSTRACT

A control circuit for stopping a booster circuit and an electronic apparatus using the control circuit are described. The electronic apparatus includes a control circuit, a booster circuit and an electronic device. The control circuit is electrically coupled to the booster circuit and the battery. The booster circuit is electrically coupled to the battery and the electronic device. The booster circuit is used to boost the battery voltage, to generate an output voltage for operation of the electronic device and the control circuit. The control circuit may stop the operation of the booster circuit when the battery voltage is not higher than the first voltage, and when a number of occurrences in which the battery voltage falls below the first voltage reaches a predetermined number, or the output voltage does not reach a second voltage within a predetermined time interval.

10 Claims, 8 Drawing Sheets

CONTROL CIRCUIT FOR STOPPING VOLTAGE BOOSTER AND ELECTRONIC DEVICE USING THE SAME

CROSS-REFERENCE TO RELATED APPLICATION

This application claims the benefit of Taiwan Patent Application No. 105129093, filed on Sep. 8, 2016, at the Taiwan Intellectual Property Office, the disclosure of which is incorporated herein in its entirety by reference.

BACKGROUND OF THE INVENTION

1. Field of the Invention

The present disclosure relates to a control circuit. More particularly, the present disclosure relates to a control circuit capable of stopping the operation of a booster circuit, and an electronic apparatus using the control circuit.

2. Description of the Related Art

Electronic apparatus need electrical power to operate. A battery is a source of electrical power. If the battery voltage of the battery is too low and the battery keeps outputting current to the electronic apparatus for a period of time, the battery may be leaking liquid.

Figure 1:
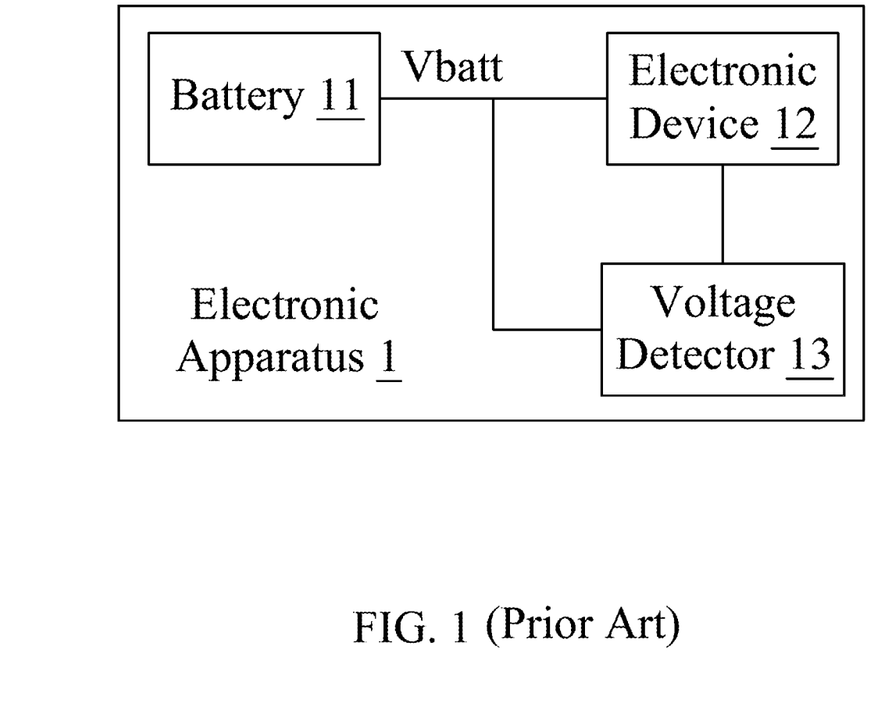
FIG. 1 is a functional block diagram of a conventional electronic apparatus.

The following refers to FIG. 1, which is a functional block diagram of a conventional electronic apparatus. The electronic apparatus 1 includes a battery 11, an electronic device 12 and a voltage detector 13. The battery 11 is electrically coupled to the electronic device 12 and the voltage detector 13, and the voltage detector 13 is electrically coupled to the electronic device 12. The battery 11 is an electrical power source for the electronic apparatus 1 and provides a battery voltage Vbatt to the electronic device 12. The voltage detector 13 is configured to detect the battery voltage Vbatt and stop operation of the electronic device 12 after detecting that the battery voltage Vbatt is lower than a predetermined voltage, in order to prevent the electronic device 12 from continuously drawing current from the battery 11. In this way, liquid leakage of the battery 11 can be prevented. For example, an AA or AAA battery with a maximum voltage of 1.5 V may be used as the battery 11. In this example, when the voltage detector 13 detects that the battery voltage Vbatt of the battery drops below 0.8 V, the voltage detector 13 stops the operation of the electronic device 12, that is, the voltage detector 13 disables the booster circuit.

Figure 2:
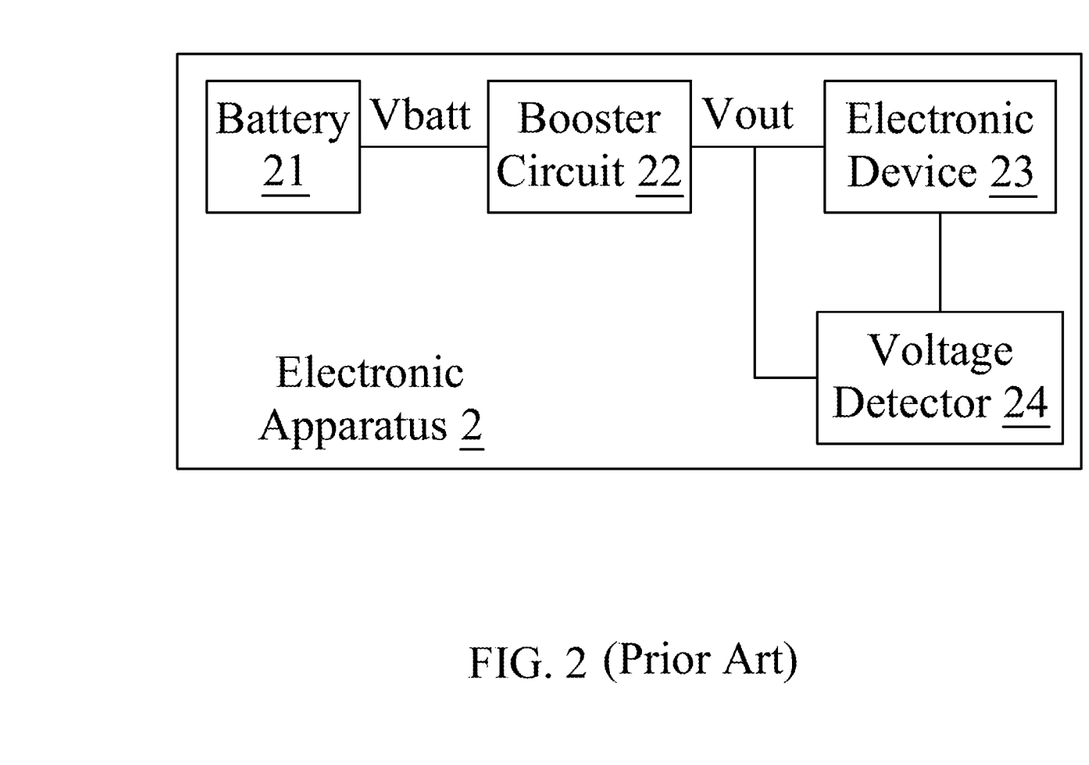
FIG. 2 is a functional block diagram of another conventional electronic apparatus.

Also, operating voltages of some electronic devices of the electronic apparatus may be higher than the maximum voltage of the battery, so the electronic apparatus may include the booster circuit to convert the battery voltage to a higher voltage for operation of the electronic devices. The following refers to FIG. 2, which shows a functional block diagram of another conventional electronic apparatus. As shown in FIG. 2, the conventional electronic apparatus 2 includes a battery 21, a booster circuit 22, an electronic device 23 and a voltage detector 24. The battery 21 is electrically coupled to the booster circuit 22, the booster circuit 22 is electrically coupled to the electronic device 23 and the voltage detector 24, and the voltage detector 24 is electrically coupled to the electronic device 23. The battery 21 serves as a power source of the electronic apparatus 2 to provide a battery voltage Vbatt to the booster circuit 22. The booster circuit 22 is configured to convert the battery voltage Vbatt to an output voltage Vout higher than the battery voltage Vbatt. The voltage detector 24 is configured to detect the output voltage Vout, and stop the operation of the electronic device 23 when detecting the output voltage as being lower than a predetermined voltage.

In the conventional electronic apparatus 2, the operation of the electronic device 23 is stopped when the battery voltage Vbatt is detected as being lower than the predetermined voltage, but the booster circuit keeps on working. In this case, the battery voltage Vbatt is too low to be converted by the booster circuit 22 into a voltage higher than the predetermined voltage, but the booster circuit 22 continuous to draw current from the battery 21, which may result in liquid leaking from the battery 21. For example, an AA or AAA battery with a maximum voltage of 1.5 V is used as the battery 21, and the booster circuit 22 converts the battery voltage Vbatt into the output voltage Vout, the output voltage Vout having a maximum voltage of 3 V which is equal to the operating voltage of the electronic device 23.

SUMMARY OF THE INVENTION

An objective of the invention of the present disclosure is to provide a control circuit capable of stopping a boost circuit which is electrically coupled between a battery and an electronic device. The control circuit includes a first voltage detector, a counter, a second voltage detector, a timer unit and a logic unit. The first voltage detector is electrically coupled to the battery and configured to detect whether a battery voltage of the battery is higher than a first voltage. The counter is electrically coupled the first voltage detector and configured to count a number of occurrences in which the battery voltage falls below the first voltage and generate a count number thereof. The second voltage detector is electrically coupled to the booster circuit and configured to detect whether an output voltage of the booster circuit reaches a second voltage which is higher than the first voltage. The timer unit is electrically coupled to the second voltage detector and configured to determine whether the output voltage reaches the second voltage within a predetermined time interval. The logic unit is electrically coupled to the first voltage detector, the counter and the timer unit, and configured to stop the operation of the booster circuit when the battery voltage is not higher than the first voltage, the count number is equal to a predetermined number, or the output voltage does not reach the second voltage within the predetermined time interval.

Another objective of the present disclosure is to provide an electronic apparatus using the above-mentioned control circuit, boost circuit and electronic device.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and in the description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

An embodiment of the present disclosure provides a control circuit adapted to stop operation of the booster circuit and of the electronic apparatus using the same, in order to prevent the booster circuit from continuing to draw current from the battery when the operation of the electronic device is stopped, which might lead to liquid leakage. The electronic apparatus includes a control circuit, a booster circuit and an electronic device. The control circuit is electrically coupled to the booster circuit and the battery, and the booster circuit is electrically coupled to the battery and the electronic device. The booster circuit is configured to boost the battery voltage of the battery, to provide the output voltage to the electronic device and to the control circuit for operation. If the battery voltage is not higher than the first voltage, the number of occurrences in which the battery voltage is not higher than the first voltage reaches the predetermined number, or the output voltage does not reach the second voltage within the predetermined time interval, then the control circuit stops the operation of the booster circuit. In the embodiment of the present disclosure, the control circuit further determines whether to stop the operation of the booster circuit according to an external trigger signal.

Figure 3:
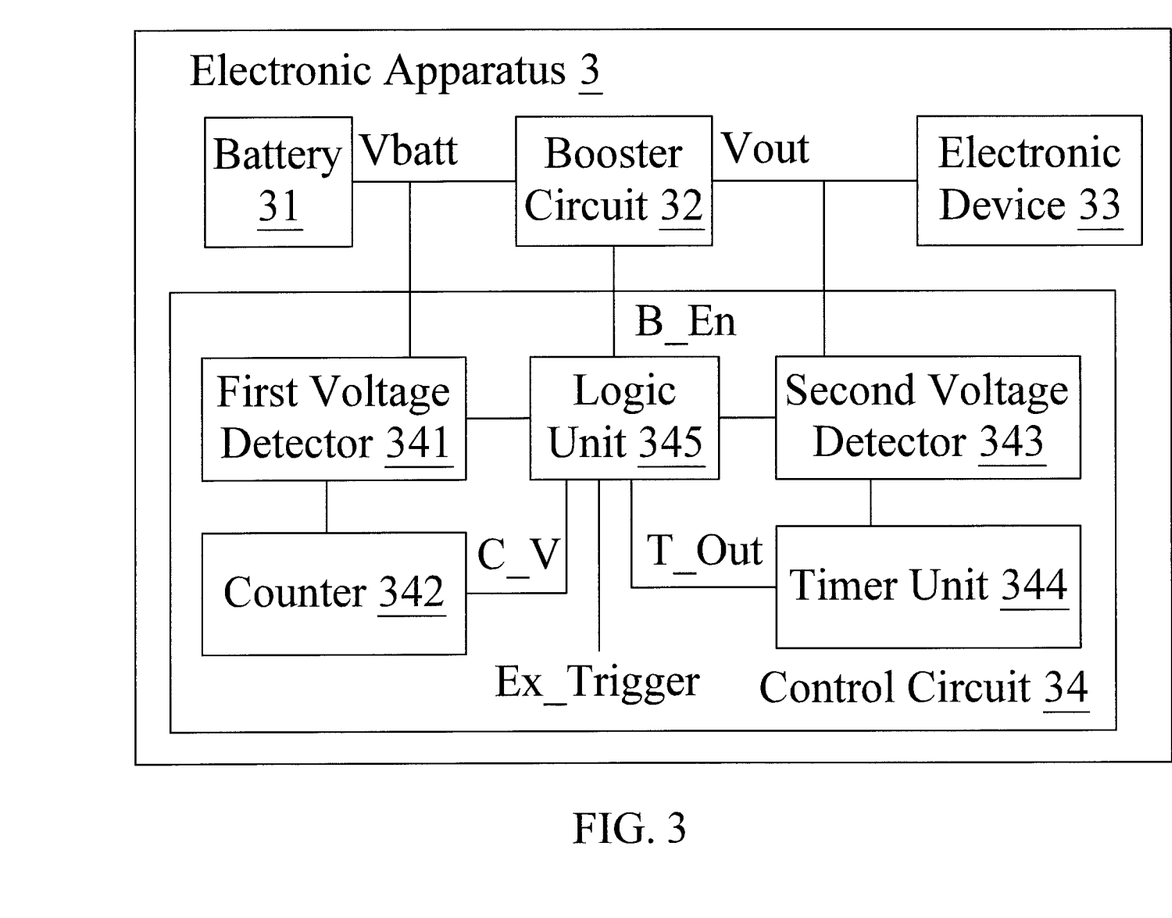
FIG. 3 is a functional block diagram of an embodiment of an electronic apparatus of the present disclosure.

The following refers to FIG. 3, which is a functional block diagram of an electronic apparatus of the embodiment of the present disclosure. The electronic apparatus 3 includes a battery 31, a booster circuit 32, an electronic device 33 and a control circuit 34. The control circuit 34 is electrically coupled to the battery 31 and the booster circuit 32, and the booster circuit 32 is electrically coupled to the battery 31 and the electronic device 33. The battery 31 serves as a power source for the electronic apparatus 3 and is configured to provide the battery voltage Vbatt to the booster circuit 32. Preferably, the battery 31 is a battery built into the electronic apparatus 3, or a detachable battery such as an AA or AAA battery which is not a fixed part of the electronic apparatus 3; however, the present disclosure is not limited to these types of the battery.

When the booster circuit 32 is not disabled (that is, the booster circuit 32 is operating normally), the booster circuit 32 is configured to boost the battery voltage Vbatt, in order to provide the output voltage Vout to the electronic device 33 and to the control circuit 34. The output voltage Vout is higher than the battery voltage Vbatt. When the output voltage Vout rises to the operating voltage of the electronic device 33, the electronic device 33 can start to operate. The electronic device may be included in an electronic toy apparatus, however the type of the electronic device 33 is not limited thereto in the present disclosure. The control circuit 34 is electrically coupled to the electronic device 33, and disables the electronic device 33 when the output voltage Vout does not reach the second voltage, in order to reduce power consumption.

The control circuit 34 detects whether the battery voltage Vbatt is not higher than the first voltage V1. If true, that is the battery voltage Vbatt is not higher than the first voltage V1, then the control circuit 34 transmits an enabling signal B_En at a logical low level to the booster circuit 32, which stops the operation of the booster circuit 32. When the battery voltage Vbatt is higher than the first voltage V1, the control circuit 34 further determines whether the number C_V of occurrences in which the battery voltage Vbatt is not higher than the first voltage V1 reaches the predetermined number. If true, that is the number C_V of occurrences in which the battery voltage Vbatt is not higher than the first voltage V1 reaches the predetermined number, then the control circuit 34 transmits a low-level logic signal to the booster circuit, in order to stop the operation of the booster circuit 32. On the other hand, if false, that is the number C_V of occurrences in which the battery voltage Vbatt is not higher than the first voltage V1 does not reach the predetermined number, then the control circuit 34 further determines whether the output voltage Vout rises to the second voltage within the predetermined time interval. Tithe output voltage Vout does not rise to the second voltage V2 within the predetermined time interval, then the control circuit 34 transmits the enabling signal B_En at a logical low level to the booster circuit 32, in order to stop the operation of the booster circuit 32. Upon receipt of the external trigger signal Ex_Trigger, the control circuit 34 can also determine whether to stop the operation of the booster circuit 32; in other words, the control circuit 34 does not activate the booster circuit 32 until the control circuit 34 receives the external trigger signal Ex_Trigger.

In the aforementioned embodiment, the battery 31 may, for example, be an AA or AAA battery which has a maximum battery voltage Vbatt of only 1.5 V, and the booster circuit 32 can boost the battery voltage Vbatt to generate the output voltage Vout of 3 V, which is equal to the operating voltage of the electronic device 33. Preferably, the first voltage V1 is 0.5 to 0.6 times the maximum voltage of the battery 31, so in this example, the first voltage V1 may be 0.8 volt; the second voltage V2 is 0.5 to 0.6 times of the operating voltage of the electronic device 33, so in this example, the second voltage V2 may be 1.8 volt.

In the beginning, the battery voltage 1.5 V of the battery 31 is generally higher than the first voltage V1 of 0.8 V, so that the output voltage Vout of the booster circuit 32 rises to the second voltage V2 of 1.8 V within the predetermined time interval after the control circuit 34 receives the trigger signal Ex_Trigger, and the output voltage Vout then continues to rises to 3 V to enable the normal functioning of the electronic device 33. Naturally, the battery voltage Vbatt gradually decreases after the battery 31 is used for a period of time. When the battery voltage Vbatt is lower than the first voltage V1 of 0.8 V, the control circuit 34 stops the operation of the booster circuit 32. After the operation of the booster circuit 32 is stopped, the battery voltage Vbatt may rise again, and the booster circuit 32 restarts when the battery voltage Vbatt rises to a voltage higher than the 0.8 V. Therefore, when the battery 31 has been used for a long period of time, the battery voltage Vbatt usually drops below the first voltage V1 many times.

When the number of occurrences in which the battery voltage Vbatt drops from above the first voltage V1 to below the first voltage V1 reaches the predetermined number, such as N which is an integer larger than or equal to 2, the control circuit 34 stops the operation of the booster circuit 32. The value of N can be changed as required. If the number of occurrences in which the battery voltage Vbatt drops from above the first voltage V1 to below the first voltage V1 does not reach the predetermined number, but nonetheless the battery voltage Vbatt is excessively low for too long, then this indicates that the output voltage Vout of the booster circuit 32 does not reach the second voltage V2 of 1.8 volt within the predetermined time interval, and so the control circuit 34 stops the operation of the booster circuit 32 to prevent liquid leaking from the battery 31 which may be caused by the booster circuit 32 overdrawing current from the battery 31.

Therefore, should any one of the three conditions be satisfied, that is: that the battery voltage Vbatt is not higher than the first voltage V1, that the number C_V of occurrences in which the battery voltage Vbatt is not higher than the first voltage V1 reaches the predetermined number, or that the output voltage Vout does not reach the second voltage V2 within the predetermined time interval, then the control circuit 34 will be triggered to stop the operation of the booster circuit 32. As a result, when the battery voltage Vbatt is excessively low, the control circuit 34 of the present disclosure is able to stop operation of the booster circuit 32, in order to prevent liquid leaking from the battery 31 caused by the booster circuit 32 overdrawing current from the battery 31. In particular, when the electronic apparatus 3 serves as a toy and the battery 31 is an AA or AAA battery, solving the liquid leakage problem of the battery 31 improves safety of the electronic apparatus 3 with regards to its use, in particular, by children.

The control circuit 34 includes a first voltage detector 341, a counter 342, a second voltage detector 343, a timer unit 344 and a logic unit 345. The first voltage detector 341 is electrically coupled to the battery 31 and the counter 342, the second voltage detector 343 is electrically coupled to the booster circuit 32 and the timer unit 344, and the logic unit 345 is electrically coupled to the first voltage detector 341, the counter 342 and the timer unit 344. The first voltage detector 341 is configured to detect whether the battery voltage Vbatt is not higher than the first voltage V1. The counter 342 is configured to count the number C_V of occurrences in which the battery voltage Vbatt falls below the first voltage V1. The second voltage detector 343 is configured to detect whether the output voltage Vout rises to the second voltage V2.

The timer unit 344 is configured to determine whether the output voltage Vout rises to the second voltage V2 within the predetermined time interval. For example, the timer unit 344 can measure the time interval in which the output voltage Vout rises to the second voltage V2; if the output voltage Vout does not rise to the second voltage V2 within the predetermined time interval, and the timer unit 344 outputs an overflow signal T_Out. When the battery voltage Vbatt is not higher than the first voltage V1, the number C_V is not lower than the predetermined number, or the output voltage Vout does not reach the second voltage V2 within the predetermined time interval, then the logic unit 345 outputs the enabling signal B_En at a logical low level to the booster circuit 32, in order to stop operation of the booster circuit 32.

Figure 4:
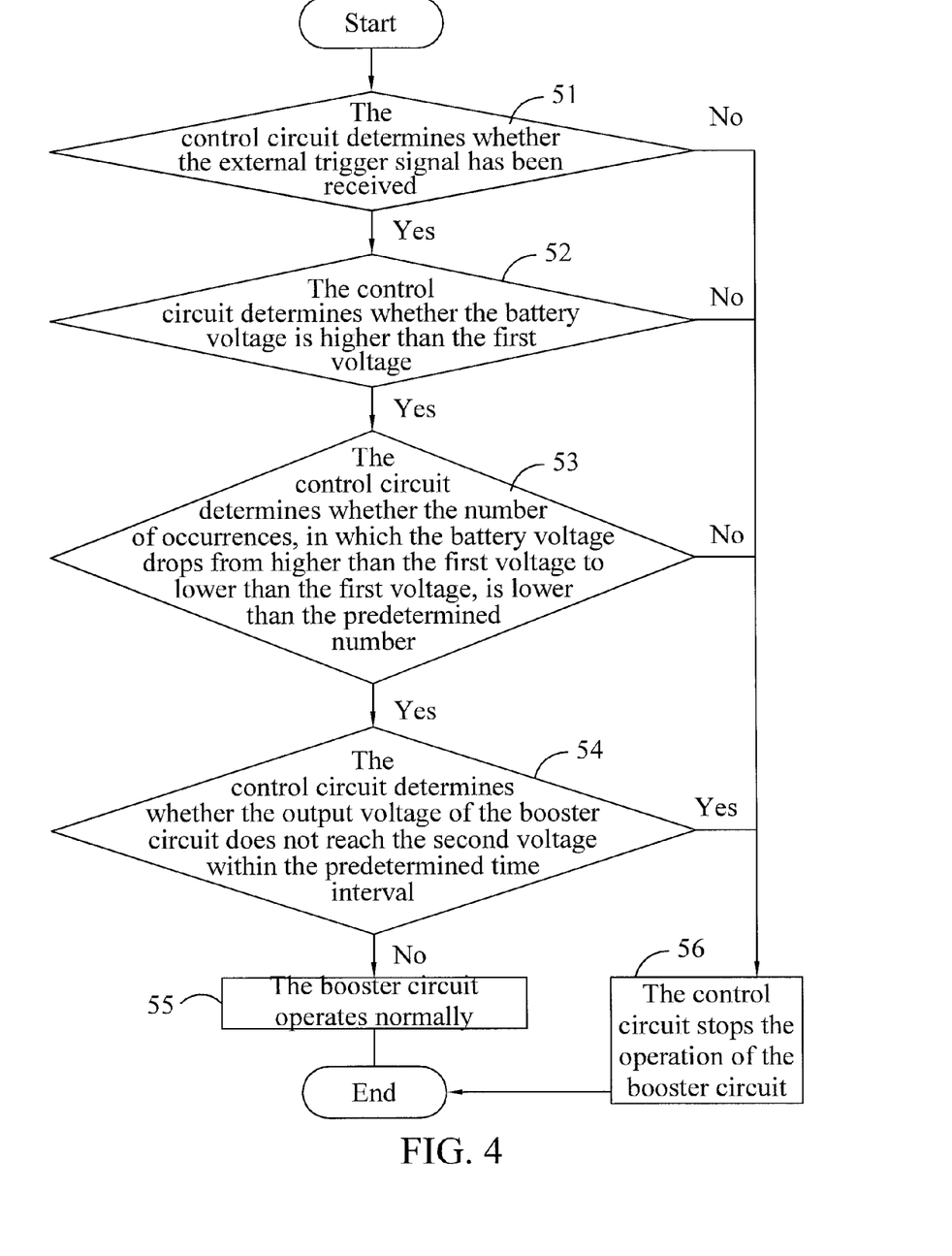
FIG. 4 is a functional block diagram of showing detail of the control circuit of an embodiment of the present disclosure.

The following refers to FIG. 4, which is a functional block diagram showing detail of the control circuit of the embodiment of the present disclosure. The components shown in FIG. 4 are for the purpose of illustration only, and the present disclosure is not limited thereto. In this embodiment, the first voltage detector 341 includes a first reference voltage generator 3411 and a comparator 3412. Negative and positive input terminals of the comparator 3412 respectively receive the battery voltage Vbatt and the first voltage V1 generated by the first reference voltage generator 3411. When the battery voltage Vbatt is not higher than the first voltage V1, the comparator 3412 outputs a signal at a logical high level. In order to implement the first voltage detector 341, the counter 342 may include a negative edge trigger counter 3421 to count the number C_V of occurrences in which the battery voltage Vbatt falls below the first voltage V1. If the negative and positive input terminals of the comparator 3412 are interchanged to respectively receive the first voltage V1 and the battery voltage Vbatt, then the counter 342 may use a positive edge trigger counter instead of the negative edge trigger counter 3421.

The second voltage detector 343 includes a second reference voltage generator 3431 and a comparator 3432. The negative and positive input terminals of the comparator 3432 respectively receive the output voltage Vout and the second voltage V2 generated by the second reference voltage generator 3431. When the output voltage Vout is higher than the second voltage V2, the comparator 3432 outputs a signal at a logical low level. The timer unit 344 includes a timer 3441 which has a reset terminal electrically coupled to an output terminal of the comparator 3432. The timer 3441 stops timing upon receipt of the signal at a logical low level outputted from the comparator 3432. The maximum time interval measurable by the timer 3441 may be the predetermined time interval. When the timer 3441 has timed the predetermined time interval and has not received the signal at a logical low level from the comparator 3432, then the timer 3441 outputs the overflow signal T_Out to indicate that the output voltage Vout has not reached the second voltage V2 within the predetermined time interval.

The logic unit 345 includes a logic circuit 3451 with multiple logic gates. The logic circuit 3451 receives the external trigger signal Ex_Trigger, the output signal of the comparator 3412, the number C_V and the overflow signal T_Out, and determines whether the enabling signal B_En is set at a logical high or low level, through computation of the multiple logic gates. In other words, through computation of the combined logic gates, the logic circuit 3451 outputs the enabling signal B_En at a logical low level when not receiving the external trigger signal Ex_Trigger, when the output signal of the comparator 3412 is at a logical high level, when the number C_V reaches the predetermined number, or when the overflow signal T_Out has been received.

Figure 5:
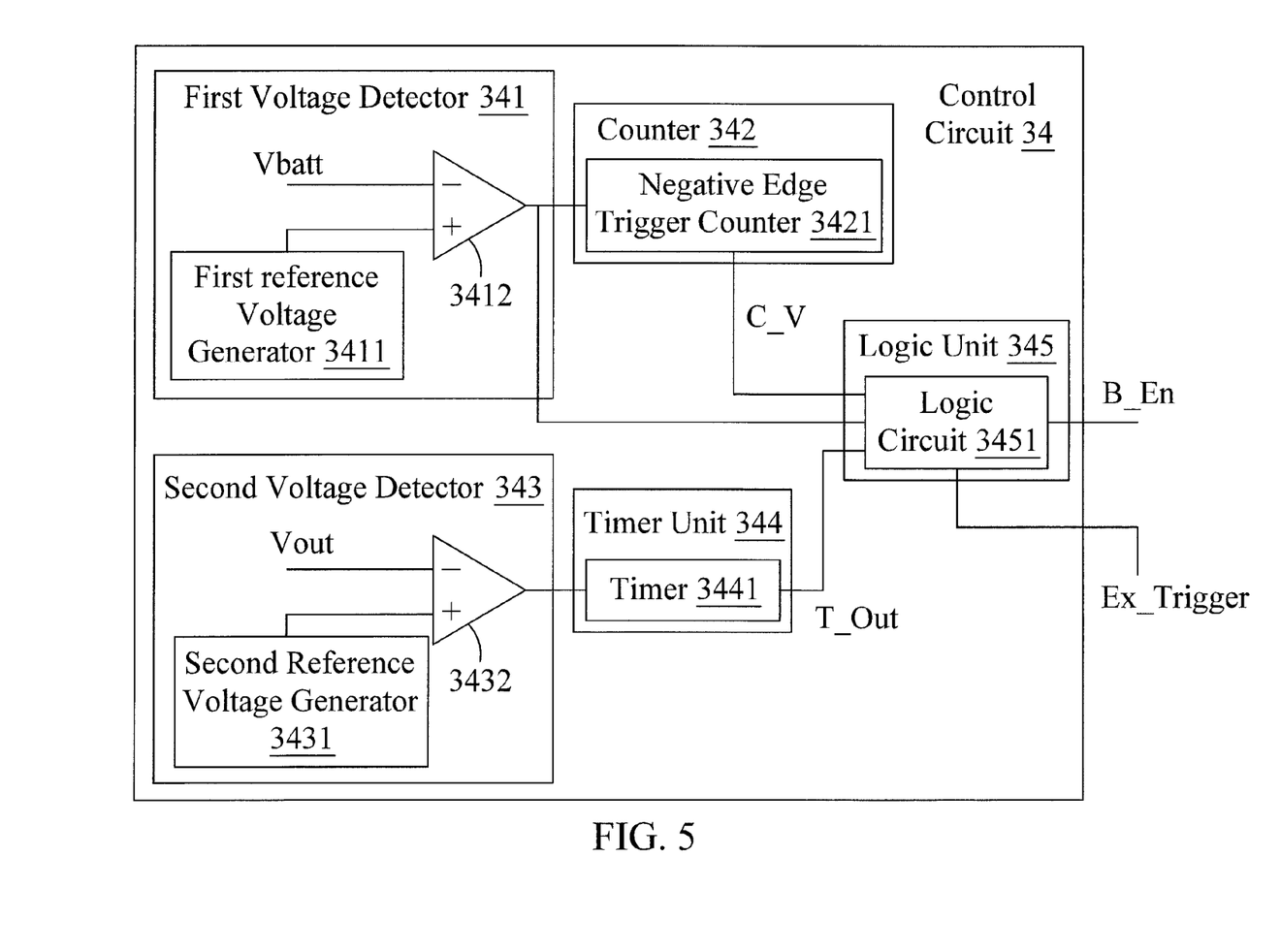
FIG. 5 is a flowchart showing the steps in a control method for stopping a booster circuit of the embodiment of the present disclosure.

The following refers to FIG. 5, which is a flowchart showing the steps in an operation of stopping the booster circuit. The embodiment of the control method of stopping the booster circuit is performed on the control circuit of the aforementioned electronic apparatus, but the present disclosure is not limited thereto. First, in a step 51, the control circuit determines whether the external trigger signal has been received. If the control circuit does not receive the external trigger signal, a step 56 is performed next; otherwise, a step 52 is performed. In the step 52, the control circuit determines whether the battery voltage is higher than the first voltage. If the battery voltage is not higher than the first voltage, the step 56 is performed next; otherwise, a step 53 is performed.

In the step 53, the control circuit determines whether the number of occurrences in which the battery voltage drops from higher than the first voltage to lower than the first voltage, is lower than the predetermined number. If the number of occurrences that the battery voltage is changed from higher than the first voltage to lower than the first voltage reaches the predetermined number, the step 56 is performed next; otherwise, a step 54 is performed. In the step 54, the control circuit determines whether the output voltage of the booster circuit does not reach the second voltage within the predetermined time interval. If the output voltage of the booster circuit does not reach the second voltage within the predetermined time interval, a step 56 is performed; otherwise, a step 55 is performed. In the step 55, the control circuit does not stop the operation of the booster circuit, and the booster circuit operates normally. In the step 56, the control circuit stops the operation of the booster circuit, to prevent the booster circuit from overdrawing current from the battery and potentially causing liquid to leak from the battery.

Figure 6:
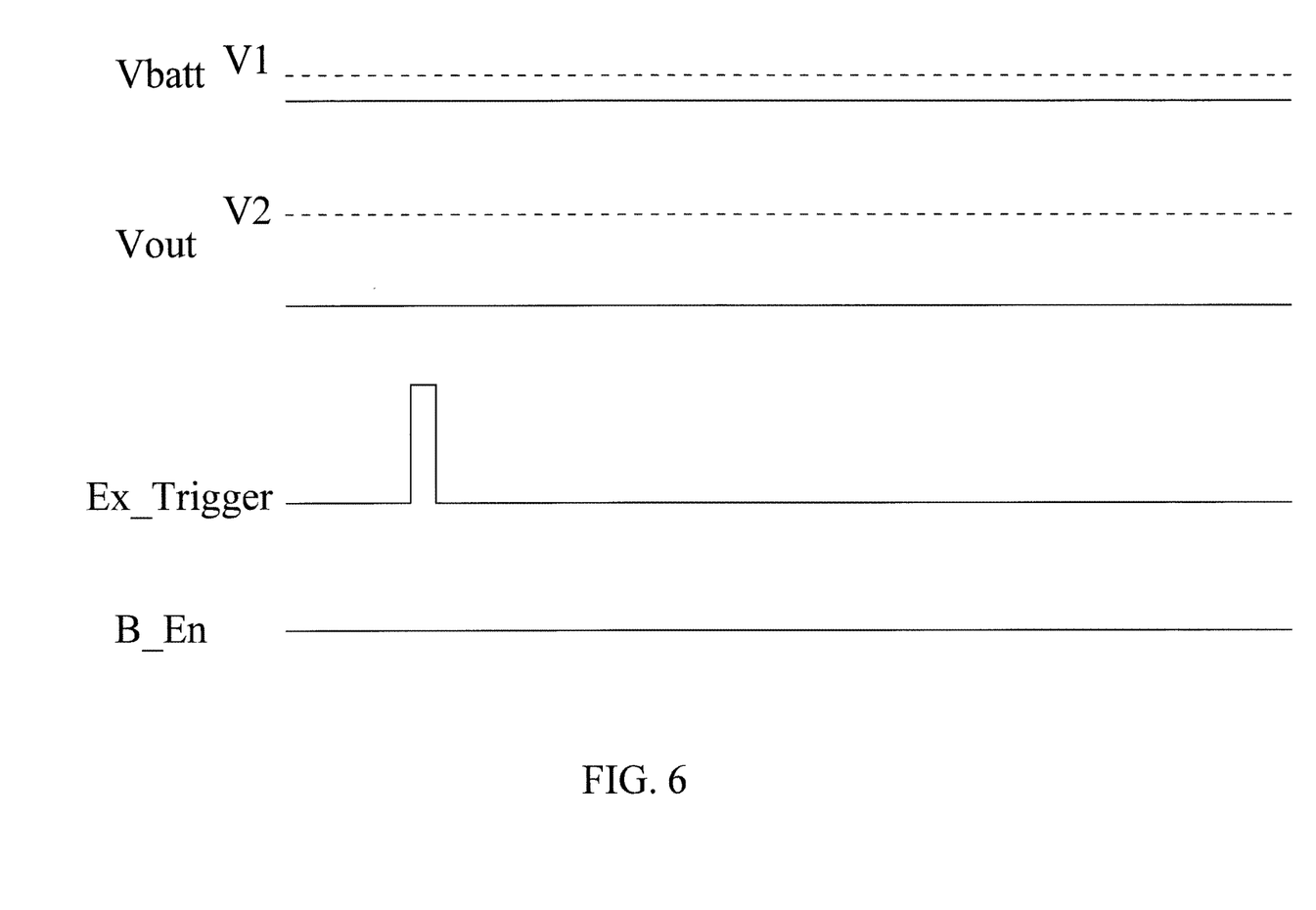
FIG. 6 is a waveform diagram showing signals associated with a first case of stopping the operation of the booster circuit of the embodiment of the present disclosure.

The following refers to FIG. 6, which is a waveform diagram showing signals associated to a first case of operation of stopping the booster circuit. The control circuit may receive the external trigger signal Ex_Trigger indicating that operation of the booster circuit is permitted. However, the booster circuit is still not activated and its operation is stopped (that is, the enabling signal B_En is at a logical low level), because the battery voltage Vbatt is not higher than the first voltage V1. Therefore, the output voltage Vout does not rise.

Figure 7:
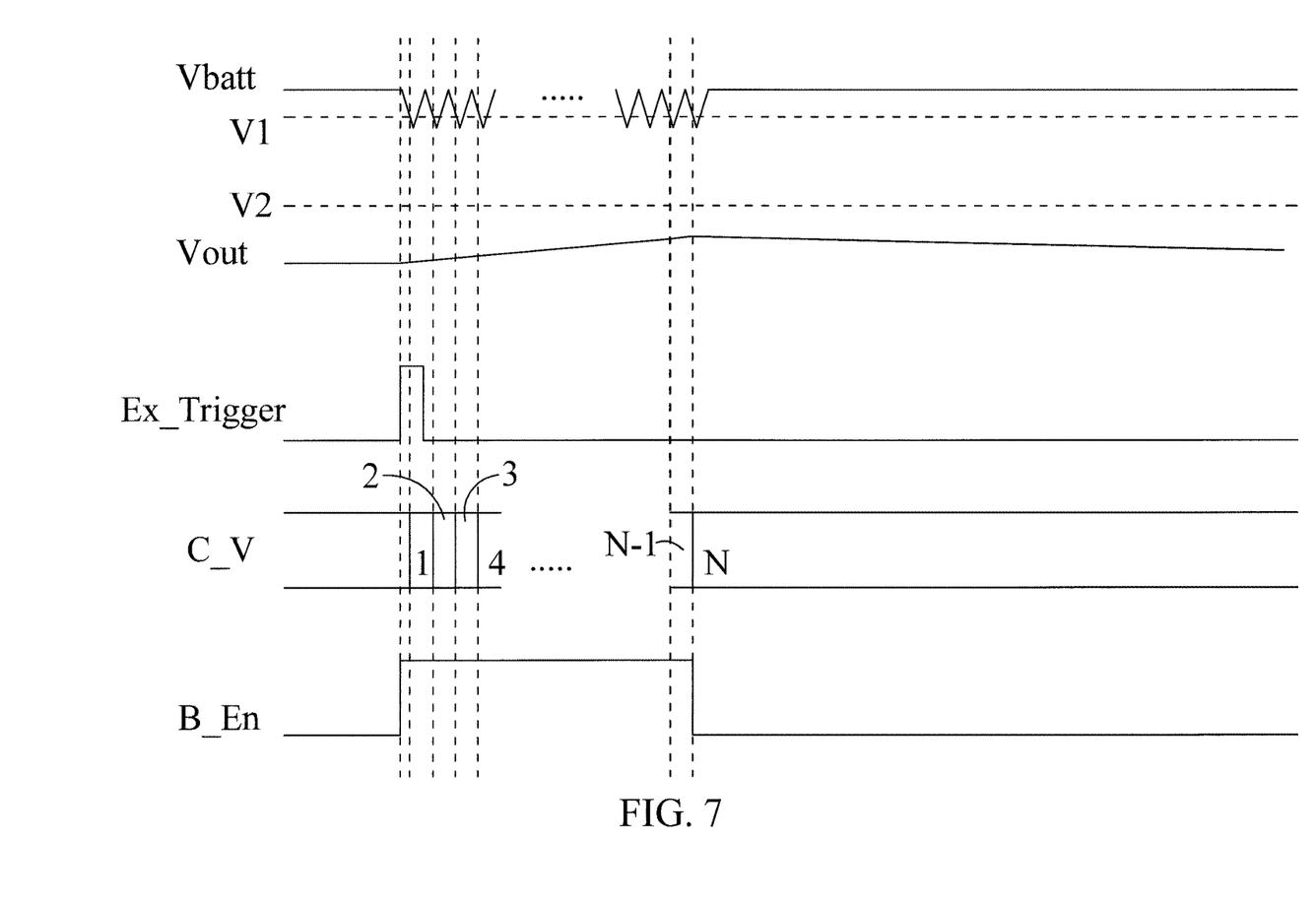
FIG. 7 is a waveform diagram showing signals associated with a second case of stopping the operation of the booster circuit of the embodiment of the present disclosure.

The following refers to FIG. 7, which is a waveform diagram of signals associated to a second case of operation of stopping the booster circuit. When the control circuit receives the external trigger signal Ex_Trigger and the battery voltage Vbatt is higher than the first voltage V1, the booster circuit works normally (that is, the enabling signal B_En is at a logical high level). When the battery has been used for a long time, the battery voltage Vbatt of the battery may drop to a lower voltage than the first voltage V1 several times, and so the operation of the booster circuit is stopped (that is, the enabling signal B_En is at a logical low level) after the number of occurrences in which the battery voltage Vbatt drops from above the first voltage V1 to below the first voltage V1 reaches the predetermined number N. Therefore, the output voltage Vout does not rise.

Figure 8:
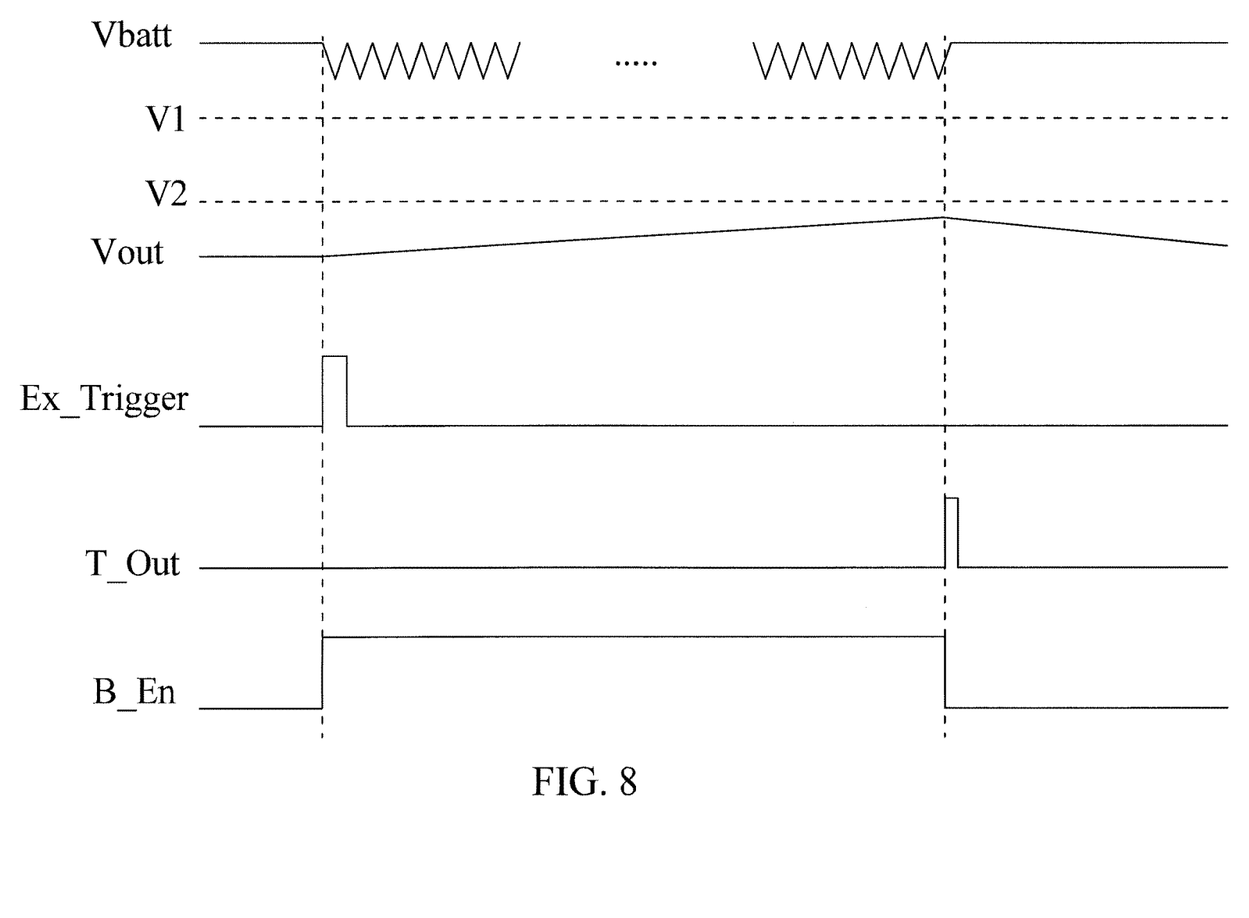
FIG. 8 is a waveform diagram showing signals associated with a third case of stopping the operation of the booster circuit of the embodiment of the present disclosure.

The following refers to FIG. 8, which is a waveform diagram of signals associated to a third case of operation of stopping the booster circuit. After the control circuit receives the external trigger signal Ex_Trigger, if the battery voltage Vbatt is higher than the first voltage V1 and the number C_V does not reach the predetermined number, the booster circuit works normally (that is, the enabling signal B_En is set at a logical high level). However, the battery voltage Vbatt is still too low, as it causes the output voltage of the booster circuit to not reach the second voltage V2 within the predetermined time interval (the overflow signal T_Out is at a logical high level), and so the operation of the booster circuit is stopped (that is, the enabling signal B_En is set at a logical low level). Therefore, the output voltage Vout does not rise.

To summarize, the embodiment of the control circuit of the present disclosure is able to stop the operation of the booster circuit if any one of the three conditions is satisfied, that is: that the battery voltage is lower than the first voltage, that the number of occurrences in which the battery voltage is lower than the first voltage reaches the predetermined number, or that the output voltage of the booster circuit is unable to reach the second voltage within the predetermined time interval. Therefore, when the battery voltage is too low, the booster circuit is stopped from drawing current from the battery, so as to prevent liquid leaking from the battery. When the electronic apparatus with the control circuit serves as toy, the problem where a child may accidentally ingest or touch the leaked battery fluid can be prevented, and therefore the electronic apparatus using the control circuit of the present disclosure is safer.

The present invention disclosed herein has been described by means of specific embodiments. However, numerous modifications, variations and enhancements can be made thereto by those skilled in the art without departing from the spirit and scope of the invention set forth in the claims.

What is claimed is:

1. A control circuit adapted to stop for stopping a booster circuit which is electrically coupled between a battery and an electronic device, and the control circuit comprising:
    a first voltage detector, electrically coupled to the battery and configured to detect whether a battery voltage of the battery is higher than a first voltage;
    a counter, electrically coupled to the first voltage detector and configured to count when the battery voltage falls below the first voltage, to generate a count number;
    a second voltage detector, electrically coupled to the booster circuit and configured to detect whether an output voltage of the booster circuit reaches a second voltage which is higher than the first voltage;
    a timer unit, electrically coupled to the second voltage detector and configured to determine whether the output voltage reaches the second voltage within a predetermined time interval; and
    a logic unit, electrically coupled to the first voltage detector, the counter and the timer unit, and configured to stop an operation of the booster circuit when the battery voltage is not higher than the first voltage, the count number is equal to a predetermined number, or the output voltage does not reach the second voltage within the predetermined time interval.

2. The control circuit according to claim 1, wherein the booster circuit is stopped when the battery voltage is not higher than the first voltage, and the booster circuit restarts after the battery voltage rises to a higher voltage than the first voltage.

3. The control circuit according to claim 1, wherein the logic unit determines whether to stop the operation of the booster circuit upon receipt of a trigger signal.

4. The control circuit according to claim 1, wherein:
the timer unit comprises a timer electrically coupled to the second voltage detector,
the predetermined time interval is a maximum time interval measurable by the timer,
the timer is configured to measure a time interval in which the output voltage reaches the second voltage, and
if the output voltage does not reach the second voltage within the predetermined time interval, the timer outputs an overflow signal to indicate that the output voltage does not reach the second voltage within the predetermined time interval.

5. The control circuit according to claim 1, wherein the first voltage is 0.5 to 0.6 times a maximum voltage of the battery, and the second voltage is 0.5 to 0.6 times an operating voltage of the electronic device.

6. An electronic apparatus, comprising:
a battery;
a booster circuit;
an electronic device;
a control circuit comprising:
   a first voltage detector, electrically coupled to the battery and configured to detect whether a battery voltage of the battery is higher than a first voltage;
   a counter, electrically coupled the first voltage detector and configured to count when the battery voltage falls below the first voltage, to generate a count number;
   a second voltage detector, electrically coupled to the booster circuit and configured to detect whether an output voltage of the booster circuit reaches a second voltage which is higher than the first voltage;
   a timer unit, electrically coupled to the second voltage detector and configured to determine whether the output voltage reaches the second voltage within a predetermined time interval; and
   a logic unit, electrically coupled to the first voltage detector, the counter and the timer unit, and configured to stop an operation of the booster circuit when the battery voltage is not higher than the first voltage, the count number is equal to a predetermined number, or the output voltage does not reach the second voltage within the predetermined time interval.

7. The electronic apparatus according to claim 6, wherein the booster circuit is stopped when the battery voltage is not higher than the first voltage, and the booster circuit restarts after the battery voltage rises to a voltage higher than the first voltage.

8. The electronic apparatus according to claim 6, wherein the logic unit determines whether to stop the operation of the booster circuit upon receipt of a trigger signal.

9. The electronic apparatus according to claim 6, wherein:
the timer unit comprises a timer electrically coupled to the second voltage detector,
the predetermined time interval is a maximum time interval measurable by the timer,
the timer is configured to measure a time interval in which the output voltage reaches the second voltage, and
if the output voltage does not reach the second voltage within the predetermined time interval, the timer outputs an overflow signal to indicate that the output voltage does not reach the second voltage within the predetermined time interval.

10. The electronic apparatus according to claim 6, wherein the first voltage is 0.5 to 0.6 times a maximum voltage of the battery, and the second voltage is 0.5 to 0.6 times an operating voltage of the electronic device.

* * * * *